United States Patent
Machnicki et al.

(10) Patent No.: US 9,465,740 B2
(45) Date of Patent: Oct. 11, 2016

(54) COHERENCE PROCESSING WITH PRE-KILL MECHANISM TO AVOID DUPLICATED TRANSACTION IDENTIFIERS

(71) Applicant: Apple Inc., Cupertino, CA (US)

(72) Inventors: Erik P. Machnicki, San Jose, CA (US); Harshavardhan Kaushikkar, San Jose, CA (US); Shinye Shiu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 13/860,885

(22) Filed: Apr. 11, 2013

(65) Prior Publication Data

US 2014/0310469 A1   Oct. 16, 2014

(51) Int. Cl.
*G06F 12/00*   (2006.01)
*G06F 12/08*   (2016.01)

(52) U.S. Cl.
CPC ... *G06F 12/0828* (2013.01); *G06F 2212/1008* (2013.01); *G06F 2212/507* (2013.01)

(58) Field of Classification Search
None
See application file for complete search history.

(56) References Cited

U.S. PATENT DOCUMENTS

| | | | |
|---|---|---|---|
| 5,226,146 A * | 7/1993 | Milia | G06F 12/0831 711/141 |
| 5,617,347 A * | 4/1997 | Lauritzen | 365/49.17 |
| 6,338,122 B1 | 1/2002 | Baumgartner et al. | |
| 6,487,637 B1 * | 11/2002 | Arimilli et al. | 711/133 |
| 7,664,928 B1 * | 2/2010 | Andrews et al. | 712/14 |
| 2004/0064649 A1 * | 4/2004 | Volpe et al. | 711/137 |
| 2005/0154805 A1 * | 7/2005 | Steely et al. | 710/52 |
| 2006/0059312 A1 * | 3/2006 | Peled et al. | 711/137 |
| 2006/0149935 A1 * | 7/2006 | Eickemeyer | G06F 9/3804 712/219 |
| 2008/0320232 A1 | 12/2008 | Vishin et al. | |
| 2009/0089510 A1 * | 4/2009 | Lee et al. | 711/141 |
| 2011/0209155 A1 * | 8/2011 | Giampapa et al. | 718/103 |
| 2013/0031314 A1 | 1/2013 | Kinter | |

\* cited by examiner

*Primary Examiner* — Tasnima Matin
(74) *Attorney, Agent, or Firm* — Meyertons, Hood, Kivlin, Kowert & Goetzel, P.C.

(57) ABSTRACT

An apparatus for processing coherency transactions in a computing system is disclosed. The apparatus may include a request queue circuit, a duplicate tag circuit, and a memory interface unit. The request queue circuit may be configured to generate a speculative read request dependent upon a received read transaction. The duplicate tag circuit may be configured to store copies of tag from one or more cache memories, and to generate a kill message in response to a determination that data requested in the received read transaction is stored in a cache memory. The memory interface unit may be configured to store the generated speculative read request dependent upon a stall condition. The stored speculative read request may be sent to a memory controller dependent upon the stall condition. The memory interface unit may be further configured to delete the speculative read request in response to the kill message.

20 Claims, 5 Drawing Sheets

COHERENCE PROCESSING WITH PRE-KILL MECHANISM TO AVOID DUPLICATED TRANSACTION IDENTIFIERS

BACKGROUND

1. Technical Field

This invention relates to computing systems, and more particularly, maintaining coherency among multiple cache memories.

2. Description of the Related Art

Computing systems may include one or more systems-on-a-chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

To implement the desired functions on an SoC, one or more processors may be employed. Each processor may include a memory system with multiple levels of caches for providing low latency access to program instructions and operands. With multiple processors accessing multiple caches as well as main memory, the issue of cache coherency may arise. For example, a given data producer, such as, e.g., one of processors, may write a copy of data in a cache, but the update to main memory's copy of the data may be delayed. In write-through caches, a write operation may be dispatched to memory in response to the write to the cache line, but the write is delayed in time. In a writeback cache, writes are made in the cache and not reflected in memory until the updated cache block is replaced in the cache (and is written back to main memory in response to the replacement).

Because the updates have not been made to main memory at the time the updates are made in cache, a given data consumer, such as, e.g., another processor, may read the copy of data in main memory and obtain "stale" data (data that has not yet been updated). A cached copy in a cache other than the one to which a data producer is coupled can also have stale data. Additionally, if multiple data producers are writing the same memory locations, different data consumers could observe the writes in different orders.

Cache coherence solves these problems by ensuring that various copies of the same data (from the same memory location) can be maintained while avoiding "stale data", and by establishing a "global" order of reads/writes to the memory locations by different producers/consumers. If a read follows a write in the global order, the data read reflects the write. Typically, caches will track a state of their copies according to the coherence scheme. For example, the popular Modified, Exclusive, Shared, Invalid (MESI) scheme includes a modified state (the copy is modified with respect to main memory and other copies); an exclusive state (the copy is the only copy other than main memory); a shared state (there may be one or more other copies besides the main memory copy); and the invalid state (the copy is not valid). The MOESI scheme adds an Owned state in which the cache is responsible for providing the data for a request (either by writing back to main memory before the data is provided to the requestor, or by directly providing the data to the requester), but there may be other copies in other caches. Maintaining cache coherency is increasingly challenging as various different types of memory requests referencing uncacheable and cacheable regions of the address space are processed by the processor(s).

SUMMARY OF THE EMBODIMENTS

Various embodiments of a circuit and method for processing read transactions received from one or more functional blocks on an integrated circuit are disclosed. Broadly speaking, an apparatus and a method are contemplated in which a speculative read request may be generated in response to receiving a read transaction. A duplicate tag circuit may be configured to store copies of tags from one or more cache memories. A memory interface unit may be configured to store the speculative read request in response to a stall condition. When the stall condition ends, the memory interface unit may send the speculative read request to a memory controller. The duplicate tag circuit may be further configured to generate a kill request responsive to a determination that data requested by the read transaction may be stored in one of the cache memories. The stored read request may be deleted by the memory interface unit dependent upon the kill request.

In one embodiment, the duplicate tag circuit may be further configured to generate a confirmation message. The confirmation message may be generated in response to a determination that the data requested in the read transaction is not stored in one of the cache memories.

In a further embodiment, the memory interface unit may be further configured to store the confirmation message. The storage of the confirmation message may depend on the stall condition.

BRIEF DESCRIPTION OF THE DRAWINGS

The following detailed description makes reference to the accompanying drawings, which are now briefly described.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

To improve computational performance, a system-on-a-chip (SoC) may include multiple processors. Each processor may employ a local cache memory to provide rapid access to local copies of instructions and operands. In some cases, there may be multiple copies of an operand. For example, there may be a copy of an operand in main memory in addition to a copy in each cache memory employed. When one of the copies of the operand is changed, the other copies must be updated as well. Maintaining consistency of data across the various memories is commonly referred to as maintaining "cache coherence."

To maintain coherence between main memory and various cache memories, requests may be sent to processors or other functional blocks within the SoC to perform certain tasks or provide certain data. During processing of read transactions, speculative reads sent to a memory controller may need to be cancelled (or "killed") when it is determined that data requested in the read transactions exists in a cache memory. In some cases, a read transaction may be cancelled before an associated speculative read can be sent to the memory controller. In such cases, a transaction identifier associated with the cancelled read transaction may be re-used, allowing another read transaction to exist sharing the transaction identifier. The embodiments illustrated in the drawings and described below may provide techniques for maintaining cache coherency, while eliminating the possibility of two transactions sharing a common transaction identifier.

System-on-a-Chip Overview

Figure 1:
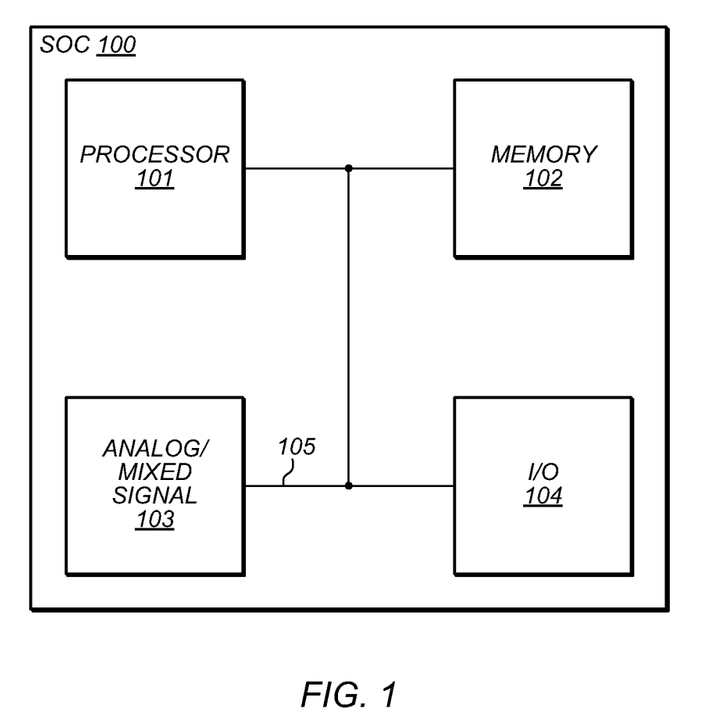
FIG. 1 illustrates an embodiment of a system on a chip.

A block diagram of an SoC is illustrated in FIG. 1. In the illustrated embodiment, SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone. Transactions on internal bus 105 may be encoded according to one of various communication protocols. For example, transactions may be encoded using Peripheral Component Interconnect Express (PCIe®), or any other suitable communication protocol.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, Phase Change Memory (PCM), or a Ferroelectric Random Access Memory (FeRAM), for example. It is noted that in the embodiment of an SoC illustrated in FIG. 1, a single memory block is depicted. In other embodiments, any suitable number of memory blocks may be employed.

As described in more detail below, processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA).

Analog/mixed-signal block 103 may include a variety of circuits including, for example, a crystal oscillator, a phase-locked loop (PLL), an analog-to-digital converter (ADC), and a digital-to-analog converter (DAC) (all not shown). In other embodiments, analog/mixed-signal block 103 may be configured to perform power management tasks with the inclusion of on-chip power supplies and voltage regulators. Analog/mixed-signal block 103 may also include, in some embodiments, radio frequency (RF) circuits that may be configured for operation with cellular telephone networks.

I/O block 104 may be configured to coordinate data transfer between SoC 100 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, I/O block 104 may be configured to implement a version of Universal Serial Bus (USB) protocol or IEEE 1394 (Firewire®) protocol.

I/O block 104 may also be configured to coordinate data transfer between SoC 100 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface port.

Each of the functional blocks included in SoC 100 may be included in separate power and/or clock domains. In some embodiments, a functional block may be further divided into smaller power and/or clock domains. Each power and/or clock domain may, in some embodiments, be separately controlled thereby selectively deactivating (either by stopping a clock signal or disconnecting the power) individual functional blocks or portions thereof.

Figure 2:
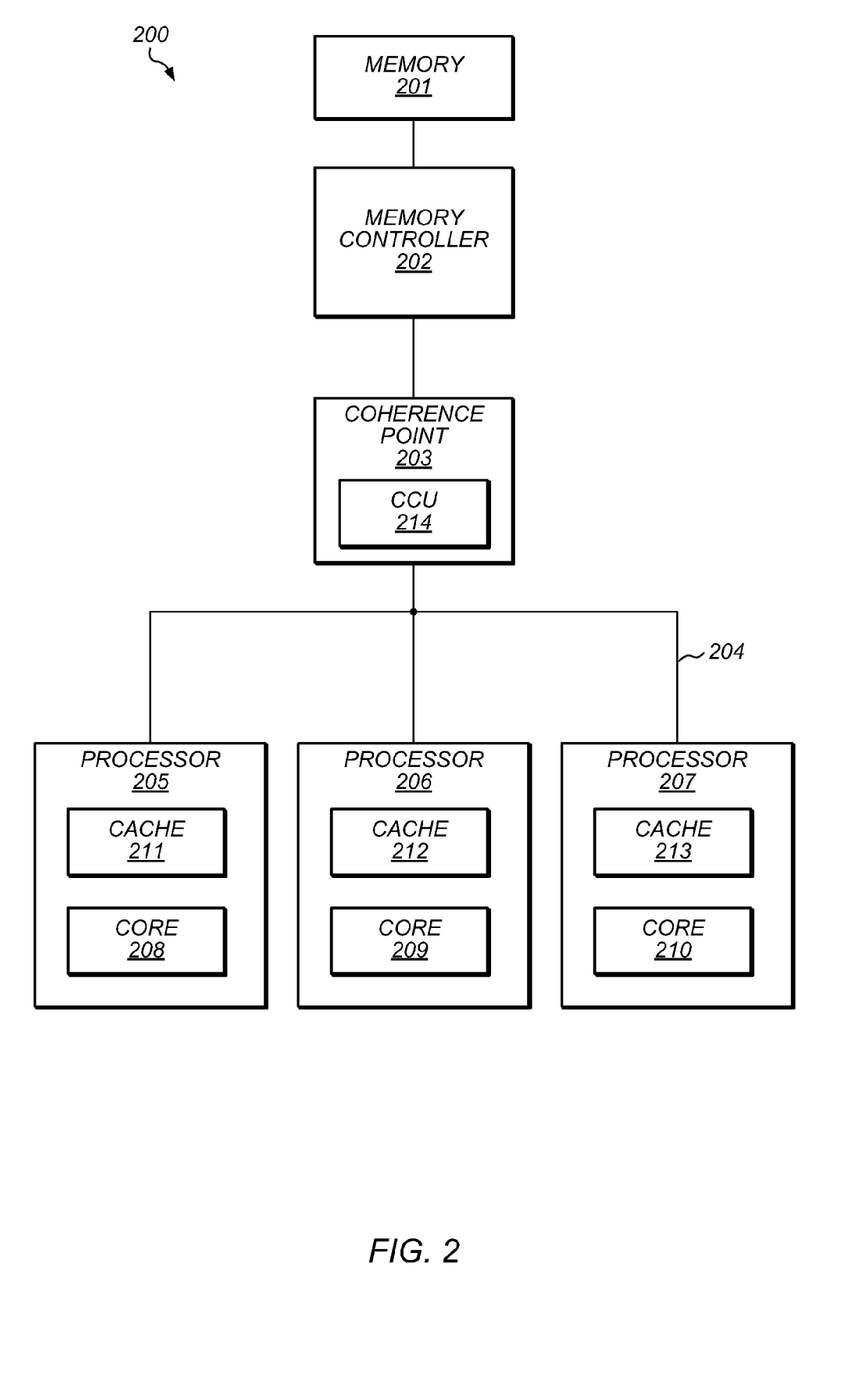
FIG. 2 illustrates another embodiment of a system on a chip.

Turning to FIG. 2, another embodiment of an SoC is depicted. In the illustrated embodiment, SoC 200 includes a memory 201, a memory controller 202, a coherence point circuit 203, and processors 205, 206, and 207. Processor 205 includes processor core 208 and cache memory 211. Similarly, processor 206 includes processor core 209 and cache memory 212, and processor 207 includes processor core 210 and cache memory 213.

Each of processors 208, 209, and 210 are coupled to coherence point circuit 203 through bus 204. It is noted that although only three processors are depicted, in other embodiments, different numbers of processors as well as other functional blocks (also referred to herein as "agents") may be coupled to bus 204.

Memory 201 may, in some embodiments, include one or more DRAMs, or other suitable memory device. Memory 201 is coupled to memory controller 202 which may be configured to generate control signals necessary to perform read and write operations to memory 201. In some embodiments, memory controller 202 may implement one of various communication protocols, such as, e.g., a synchronous double data rate (DDR) interface. A command buffer and data buffer may, in other embodiments, be included in memory controller 202. The command and data buffers may be configured to store commands, and data associated with a given command, pending execution by memory controller 202. Each buffer may be of any suitable size to hold multiple commands.

In some embodiments, coherence point circuit 203 may include a coherence control unit (CCU) 214. CCU 214 may be configured to receive requests and responses (collectively referred to as "transactions") between processors 208, 209, and 210, and memory 201. Each received transaction may be evaluated in order to maintain coherency across cache memories 211, 212, and 213, and memory 201. CCU 214 may maintain coherency using one of various coherency protocols such as, e.g., Modified Share Invalid (MSI) protocol, Modified Owned Exclusive Shared Invalid (MOESI) protocol, or any other suitable coherency protocol. Although only one CCU is depicted in FIG. 2, in other embodiments, coherence point circuit 203 may include any suitable number of CCUs.

Cache memories 211, 212, and 213 may be designed in accordance with one of various design styles. For example, in some embodiments, cache memories 211, 212, and 213 may be fully associative, while in other embodiments, the memories may be direct-mapped. Each entry in the cache memories may include a "tag" (which may include a portion of the address of the actual data fetched from main memory). In some embodiments, coherence point circuit 203 may include a set of duplicate tags for the cache entries in each of cache memories 211, 212, and 213.

It is noted that embodiment of an SoC illustrated in FIG. 2 is merely an example. In other embodiments, different numbers of processors and other functional blocks may be employed.

Coherence Processing

Figure 3:
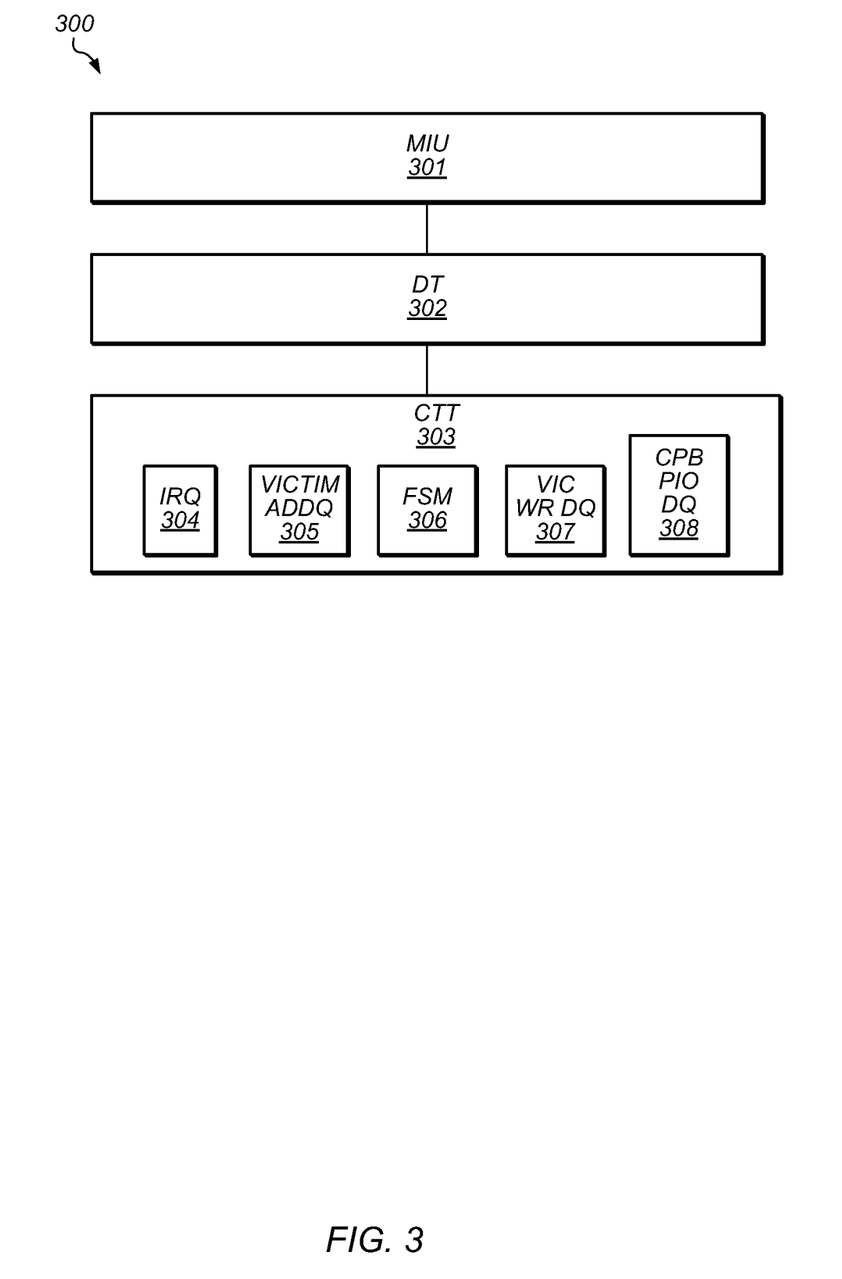
FIG. 3 illustrates an embodiment of a coherence control unit.

Turning to FIG. 3, an embodiment of a coherency control unit (CCU) is illustrated. CCU 300 may, in some embodiments, correspond to CCU 213 in coherence point circuit 203 of SoC 200 as illustrated in FIG. 2. In the illustrated embodiment, CCU 300 includes memory interface unit (MIU) 301, duplicate tag (DT) pipeline 302, and current transaction table (CTT) 303. MIU 301 interfaces to a memory controller (not shown), and is coupled to DT 302. CTT 303 interfaces to one or more agents (not shown) and is also coupled to DT 302.

MIU 301 may be configured to send read and write requests leaving CCU 300 to a memory controller, such a memory controller 202 as depicted in SoC 200 as illustrated in FIG. 2. In some embodiments, MIU 301 may send read and write requests to the memory controller from multiple sources, such as, e.g., speculative reads, writes from a victim write data queue, and writes from the copy back queue. MIU 301 may include an arbitration circuit which selects between the various sources of read and write requests. In some embodiments, the arbitration circuit may perform a least recently granted (LRG) algorithm, or any other suitable arbitration algorithm.

DT 302 may be configured to store copies of cache tags (collectively referred to as "duplicate tags"), such as the tags from cache memories 211, 212, and 213 as illustrated in FIG. 2. Access to the duplicate tags may be controlled by a multi-stage pipeline. In some embodiments, incoming addresses may be compared with the duplicate tags to determine which, if any, agent's cache memories contain the cache block associated with the incoming address. When a match is found (commonly referred to as a "cache hit"), the transaction may require coherence processing, i.e., verifying that all copies of requested cache block have the same data. When no match is found (commonly referred to as a "cache miss"), the transaction associated with the incoming address may not require coherence processing, and any associated memory operations may be sent to a memory through MIU 301.

In various embodiments, CTT 303 may include an incoming request queue (IRQ) 304, a victim address queue 305, a victim write data queue 307, a copy back peripheral input/output (PIO) response queue 308, and a coherence processing/snoop control (finite-state machine) FSM and scoreboard logic 306.

All incoming requests may be stored in IRQ 304. The requests may remain in IRQ 304 for varying durations dependent upon the time required to process the transaction. IRQ 304 may contain any suitable number of entries, and a credit-based control mechanism may be employed by CCU 300 to determine whether new requests may be added to the IRQ 304. In some embodiments, multiple flip-flops may be employed to implement each entry of IRQ 304. The number of flip-flops may, in other embodiments, correspond to the number of data bits within a data packet transmitted on a bus, such as, e.g., bus 204 as illustrated in FIG. 2.

In coming requests may be compared against existing entries in IRQ 304 in order to establish any dependencies. In some embodiments, requests stored in IRQ 304 may be sent to DT 302 for tag lookup.

Each received read request from an agent may contain the request address and way information necessary to identify which way the line will fill in the requesting agent's cache memory. In some cases, a cache line may already be at the location specified by the received request address and way information. Such a cache line is commonly referred to as a "victim line" and may need to be written back to memory (also referred to herein as being "evicted") before that location in the cache may be filled.

When a victim line is either in the modified or owned state in a cache memory, the cache line may be dirty, i.e., the line has been changed from its original state, and the requesting agent may be required to write the victim cache line back to memory. For the duration that CCU 300 is processing a transaction with a given victim address, no other transaction to the same address as the victim address may be allowed to proceed. To ensure that no other transactions proceed, dependency checking is performed. To allow for dependency checking, each incoming victim address may be stored in victim address queue 305. In some embodiments, there may be one entry in victim address queue 305 for each transaction entry in CTT 303. Victim address queue 305 may, in some embodiments, employ a flip-flops and a content-addressable memory (CAM) structure to facilitate dependency checking.

For each request that has an associated victim, CCU 300 may send a pull victim request to the requesting agent to retrieve the victim cache line. In response to the pull victim request, the agent responds with the cache line being evicted. The cache line may be stored in victim write data queue 307 until coherence processing FSM 306 arbitrates and writes the data to memory, such as memory 201 as illustrated in FIG. 2. In some embodiments, there may be one entry in victim write data queue 307 for each transaction entry in CTT 303.

Read requests that generate a hit within DT 302 may receive data from one or more of the cache memories. Such data is labeled as copy back data and may be stored in copy back PIO response queue 308, and write requests of copy back data may be initiated from copy back PIO response queue 308. In some embodiments, copy back PIO response queue 308 may be implemented using dual-port static random access memories (SRAMs) or any other suitable memory circuit. In some embodiments, data returned from PIO transaction may be stored in copy back PIO response queue 308 before the data is forwarded onto the requesting agent.

Processing of coherence transactions may be controlled by coherence processing/snoop control FSM and scoreboard logic 306. The scoreboard logic may, in various embodiments, track requests and corresponding response to the requests from agents within an SoC, such as, e.g., SoC 200 as illustrated in FIG. 2. In some embodiments, one instance of coherence processing/snoop control FSM and scoreboard logic 306 may included per entry in CTT 303.

The FSM portion of coherence processing/snoop control FSM and scoreboard logic 306 may, in some embodiments, be implemented as a sequential logic circuit, i.e., a logic circuit whose next logical state is dependent on the current logical state in additional to present input, configured to transition through a pre-determined number of logical states. The sequential logic circuit may include one or more flip-flop circuits. Each flip-flop circuit may be implemented in accordance with any number of design styles, such as, e.g., dynamic or static circuit design styles.

The scoreboard may be implemented using one or more state registers. Each of the state registers may be set when a corresponding event occurs, or when a request is made by the coherence processing logic to either the memory or an agent. A state register may be reset when an expected event has occurred, or when a request that has been made progresses. In some embodiments, the logical state of the state registers may be combined to form a signal indicating that coherence processing for the transaction associate with the scoreboard has completed.

The scoreboard may be organized to manage multiple independent sets of operations or "flows" associated with a given transaction. For example, a read request that has a victim and encounters a hit in DT 302 may need to simultaneously utilize a flow of coherence handling and a flow for victim handling. One both flows have completed, the scoreboard may assert the signal indicating that coherence processing has completed, which may allow the FSM to relinquish the transaction entry in IRQ 304.

It is noted that the embodiment illustrated in FIG. 3 is merely an example. In other embodiments, different functional blocks and different configurations of functional blocks are possible and contemplated.

Figure 4:
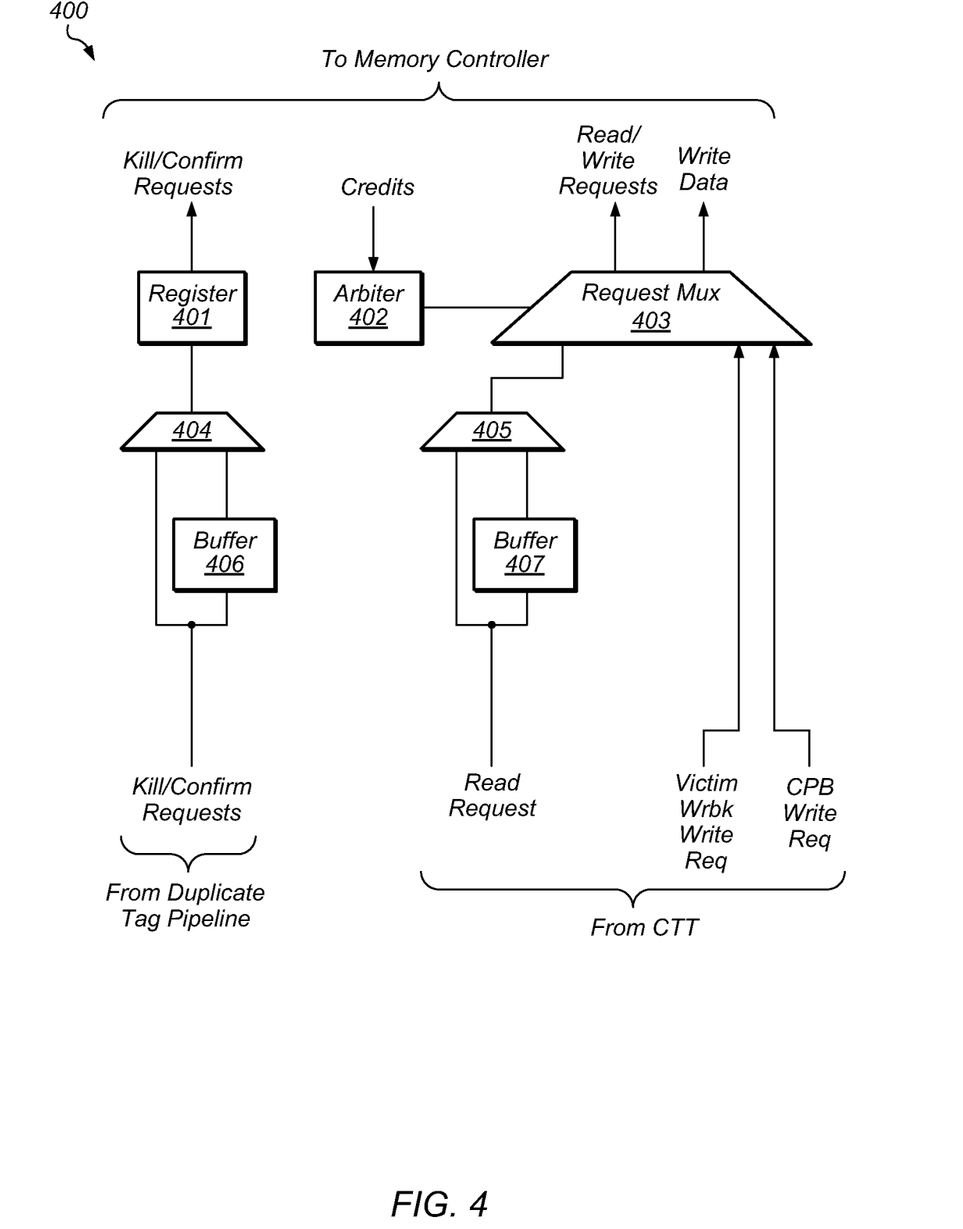
FIG. 4 illustrates an embodiment of a memory interface unit.

An example of a memory interface unit (MIU), such as MIU 301 as depicted in FIG. 3, is illustrated in FIG. 4. In the illustrated embodiment, MIU 400 may arbitrate the delivery of commands and data to a memory controller, such as memory controller 202 as depicted in FIG. 2, for example. The commands and data may include without limitation, speculative reads, writes from a victim/write data queue such as, e.g., victim/write data queue 307, and writes from the copyback queue, such as, e.g., copyback queue 308.

The illustrate embodiment includes a register 401, an arbitration circuit 402, a request multiplex circuit 403, multiplexers 404 and 405, kill/confirm buffer 406, and request buffer 407. During operation, request multiplex circuit 402 may select between read request, and writes from either victim queue or the copyback queue. In some embodiments, request multiplex circuit 402 in conjunction with arbitration circuit 402 may switch priority between read and write commands for each cycle. For example, when a write request is granted, read commands are given priority on the next cycle.

In some embodiments, MIU 400 may manage credits for the interface to the memory controller. The credits may include command credits and data credits. Read requests may be ignored when there are no command credits available, and write requests may be ignored when there are no command credits available, or insufficient data credits. In some embodiments, write requests may be ignored when there are less than two data credits. Credits may be returned by a memory controller in response to the memory controller receiving a request.

When a read transaction is received by a CCU, such as, e.g., CCU 300 as illustrated in FIG. 3, a speculative read request may be generated by a CTT. In some cases, the speculative read request may not be immediately sent to the memory controller due to arbitration of the physical bus connecting MIU 400 and a memory controller. In some embodiments, the speculative read request may be stored in a buffer (also referred to herein as being "buffered"), such as, e.g., request buffer 407, so that it may be delivered at a later time. Request buffer 407 may be implemented according to one of various design styles. In some embodiments, request buffer 407 may be implemented as a register file or any other suitable data storage circuit. In other embodiments, when request buffer 407 is empty, request buffer 407 may be bypassed by employing multiplexer 405 to allow a read request to be included in the arbitration of the current cycle.

Since read requests are buffered and go through arbitration before being sent to the memory controller, there may be a delay in sending the request to the memory controller. In some cases, it may be possible that a result of the check of duplicate tags may be completed and a confirmation or kill message may be generated before the associated read request has been sent to the memory controller. A buffer circuit, such as kill/confirm buffer 406, e.g., may in some embodiments, be employed to temporarily store a kill or confirmation message so that it may be delivered to the memory controller at least one cycle after the associated speculative read has been delivered to the memory controller. In some embodiments, the buffer may be bypassed by employing a multiplex circuit such as, e.g., multiplexer 404.

In some embodiments, a counter (not shown) may be employed to determine when a kill or confirmation message may be sent. The counter may need a sufficiently large number of bits so as to account for the latency of a tag comparison circuit, such as duplicate tag circuit 302, for example. The counter may be incremented each time a read request is delivered to the memory controller and a kill or confirmation message may be sent when the value of counter is non-zero. The counter may, in various embodiments, be decremented when a kill or confirmation message is delivered to the memory controller.

In some embodiments, read requests may include a transaction identifier. When processing such read requests, it may be possible that the determination that a given read request generates a "cache hit" may be made before the speculative read request can be sent to the memory controller. If the speculative read request remains buffered for a sufficiently long period of time, coherency processing resulting from the "cache hit" may be completed and an acknowledgement may be sent to the initiating agent. Upon receipt of the acknowledgement, the initiating agent may re-use the transaction identifier associated with the original read request. If the agent generates another read request using the previously employed transaction identifier, a situation may develop in which two speculative read requests sharing a common transaction identified are simultaneously buffered. A kill message may also be buffered for the first read request may also be buffered awaiting delivery to the memory controller.

In some cases, it is possible that the memory controller receives both of the aforementioned read requests along with the associated kill message. Since both requests and the kill message share the same transaction identifier, the memory controller may not be able to discern which of the read requests to cancel, thereby resulting in an error.

In some embodiments, a control circuit (not shown) within MIU 400 may receive a stall signal from the memory controller. The cancelled read request may, in some embodiments, be removed from request buffer 405 and the kill request from kill/confirm buffer 406 while the stall condition exists. The stall signal may, in various embodiments, be generated by the memory controller in response to a buffer within the memory controller becoming full. The removal of the cancelled read request from buffer 405 may, in some embodiments, prevent multiple read requests sharing a common transaction identifier from being sent to the memory controller.

It is noted that the embodiment illustrated in FIG. 4 is merely an example. In other embodiments, different configuration of circuit elements may be employed.

Figure 5:
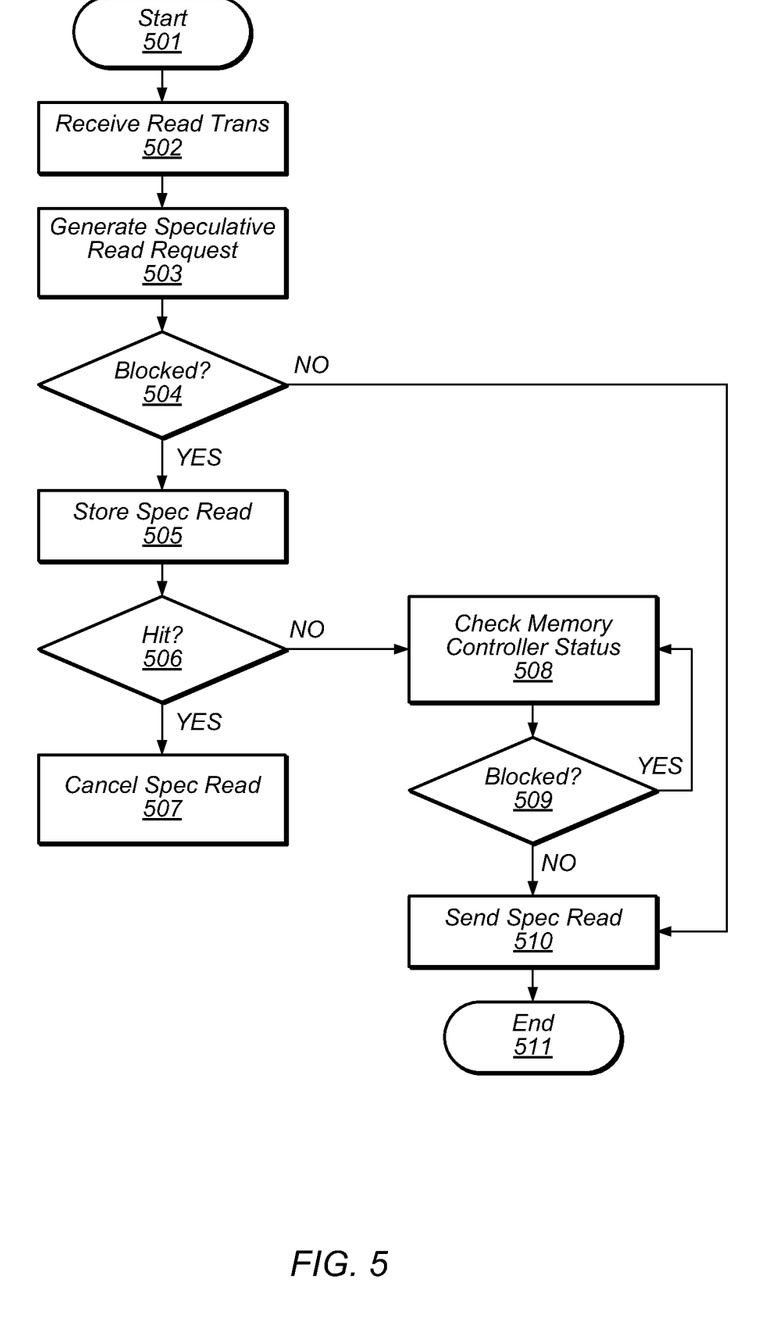
FIG. 5 illustrates a flowchart depicting an embodiment of a method for operating coherency control unit.

Turning to FIG. 5, an embodiment of a method for operating a coherency control unit, such as, e.g., coherency control unit 300 as depicted in FIG. 3, illustrated. The method begins in block 501. A read transaction may then be received (block 502). In some embodiments, the read transaction may be received by a current transaction table (CTT) such as, CTT 303 as illustrated in FIG. 3. The received read transaction may be stored in an incoming request queue such as, e.g., IRQ 304, and held in the queue until all dependencies are resolved.

Once any dependencies for the received transaction have been resolved, a speculative read request may be generated (block 503). In some embodiments, the speculative read request may be generated at substantially the same time the received read request is sent to a duplicate tag circuit, such as, DT 302, for example. Once the speculative read request has been generated, the method is then dependent upon the state of the interface to a memory controller (block 504). In some embodiments, the memory controller may be configured to operate one or memories, such as memory 201 as illustrated in FIG. 2.

When the interface to the memory controller is not blocked (i.e., there are sufficient credits to transit a request to the memory controller), a memory interface unit, such as memory interface unit 400 as illustrated in FIG. 4, may send the speculative read request to the memory controller (block 510). Once the speculative read request has been sent to the memory controller, the method may then conclude in block 511.

When the interface to the memory controller is blocked (i.e., there are insufficient credits to send the speculative read request to the memory controller), the speculative read request may be stored (block 505). In some embodiments, the speculative read request may be stored in a buffer such as, e.g., request buffer 407 of memory interface unit 400 as illustrated in FIG. 4. The buffer may store any suitable number of speculative read requests in order to allow sufficient time for the interface to the memory controller to become "unblocked."

Once the speculative read request has been stored, the operation may then depend on if the data requested in the received read transaction already exists in a cache memory (block 506). In some embodiments, a duplicate tag circuit, such as, e.g., duplicate tag circuit 302 as illustrated in FIG. 3, may contain copies of the tags for cache entries of multiple cache memories, and the received read transaction may be compared to the copies of the tags. When the requested data it not present in the cache memory (a "cache miss"), the state of the interface to the memory controller may again be checked (block 508). In some embodiments, a confirmation message with the same transaction identifier as the received read transaction may be generated and send to the memory controller. The method may then depend on the state of the interface to the memory controller (block 509).

When the interface to the memory controller is blocked, the state of interface may be checked again (block 508). When the interface to the memory controller is not blocked, the speculative read request is sent to the memory controller (block 510). In some embodiments, a memory interface unit, such as memory interface unit 400 may send the speculative read request to the memory controller. Once the speculative read request has been sent to the memory controller, the method may conclude in block 511.

When the requested data is present in the cache memory (a "cache hit"), a cancel request (also referred to herein as a "kill request") may be generated (block 507). In some embodiments, the cancel request may be generated by a duplicate tag circuit such as, e.g., duplicate tag circuit 302 as illustrated in FIG. 3. The cancel request may, in various embodiments, be sent to the memory controller, while in other embodiments, the cancel request may be stored in a buffer such as, e.g., kill/confirm buffer 406. The cancel request may include the same transaction identifier as the received read transaction, thereby instructing the memory controller to not execute the speculative read requested generated by the receipt of the read transaction. In other embodiments, when the delivery of the speculative read request is still pending, the cancel request may instruct the memory interface unit to remove the speculative read request from local storage such as, e.g., request buffer 407, for example. Removing the cancelled speculative read request from local storage may, in various embodiments, prevent the memory controller from attempting to operate on more than one read request with the same transaction identifier at the same time.

It is noted that the operations in the flowchart illustrated in FIG. 5 are depicted as being performed in a sequential fashion. In other embodiments, some or all of the operations may be performed in parallel.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a request queue circuit configured to generate a speculative read request dependent upon a received read transaction;
   a duplicate tag circuit configured to:
      store a plurality of entries, wherein each entry includes a copy of a tag portion of a corresponding entry in a given one of one or more cache memories; and
      generate a kill message responsive to a determination that data requested in the received read transaction is stored in one of the one or more cache memories; and
   a memory interface unit configured to:
      store the speculative read request in response to receiving a stall signal from a memory controller indicating a stall condition;

send the stored speculative read request to the memory controller in response to a determination that the stall condition has ended; and
delete the speculative read request responsive to the kill message.

2. The apparatus of claim 1, wherein the duplicate tag circuit is further configured to generate a confirmation message responsive to a determination that the data requested in the received read transaction is not stored in one of the one or more cache memories.

3. The apparatus of claim 2, wherein the memory interface unit is further configured to store the confirmation message dependent upon the stall condition.

4. The apparatus of claim 1, wherein the memory interface unit includes a request buffer circuit, wherein the buffer circuit is configured to store one or more speculative read requests.

5. The apparatus of claim 1, wherein to send the stored speculative read request to the memory controller, the memory interface unit is further configured to check a number of available credits.

6. The apparatus of claim 1, further comprising a kill/confirm buffer, wherein the kill/confirm buffer is configured to store one or more kill/confirm requests.

7. The apparatus of claim 1, wherein the memory interface unit includes a request buffer circuit, wherein the buffer circuit is configured to store one or more speculative read requests, and wherein to delete the speculative read request, the memory controller is further configured to remove an entry from the request buffer.

8. A method, comprising:
receiving a read transaction from a functional block on an integrated circuit;
generating a speculative read request dependent upon the received read transaction;
storing the speculative read request in response to receiving a stall from a memory controller indicating a stall condition;
comparing the read transaction to each of a plurality of entries stored in a duplicate tag circuit, wherein each entry of the plurality of entries includes a copy of a tag portion of a corresponding entry in a given cache memory of a plurality of cache memories;
generating a kill request responsive to a determination that data requested in the received read transaction is stored in one of one or more cache memories;
deleting the speculative read request responsive to the kill request; and
sending the speculative read request to the memory controller in response to determining that the stall condition has ended.

9. The method of claim 8, further comprising generating a confirm request responsive to a determination that the data requested in the received read transaction is not stored in one of the one or more cache memories.

10. The method of claim 9, wherein generating a kill request further comprises, storing the kill request in a kill/confirm buffer.

11. The method of claim 10, wherein generating a confirm request further comprises storing the confirm request in the kill/confirm buffer.

12. The method of claim 8, wherein sending the speculative read request to the memory controller comprises arbitrating the speculative read request with one or more other commands.

13. The method of claim 8, wherein storing the speculative read request comprises adding an entry to a request buffer.

14. The method of claim 13, wherein deleting the speculative read request comprises removing an entry from the request buffer.

15. A system, comprising:
a memory;
a memory controller coupled to the memory;
a coherency unit coupled to the memory controller; and
one or more processors coupled to the coherency unit, wherein each of the one or more processors includes a cache memory;
wherein the coherency unit includes:
a request queue circuit configured to generate a speculative read request dependent upon a received read transaction;
a duplicate tag circuit configured to:
store a plurality of entries, wherein each entry includes a copy of a tag portion of a corresponding entry in given one of each cache memory of the one or more processors; and
generate a kill request responsive to a determination that data requested in the received read transaction is stored in one of the one or more cache memories; and
a memory interface unit configured to:
store the speculative read request in response to receiving a stall signal from the memory controller indicating a stall condition;
send the stored speculative read request to the memory controller in response to a determination that the stall condition has ended; and
delete the speculative read request responsive to the kill request.

16. The system of claim 15, wherein the memory interface unit is further configured to store the kill request.

17. The system of claim 15, wherein the duplicate tag circuit is further configured to generate a confirm request responsive to a determination that data requested in the received read transaction is not stored in one of the one or more cache memories.

18. The system of claim 15, wherein the memory interface unit includes a request buffer, and a kill/confirm buffer.

19. The system of claim 18, wherein to store the speculative read request, the memory interface unit is further configured to add an entry to the request buffer.

20. The system of claim 15, wherein the memory comprises a dynamic random access memory (DRAM).

* * * * *